United States Patent [19]

Stanley

[11] Patent Number: 4,910,726
[45] Date of Patent: Mar. 20, 1990

[54] OPTICAL FIBRE COMMUNICATION NETWORKS WITH LOCAL OPTICAL POWER FEEDING

[75] Inventor: Ian Stanley, Ipswich, England

[73] Assignee: British Telecommunications public limited company, London, England

[21] Appl. No.: 316,575
[22] PCT Filed: Jan. 10, 1986
[86] PCT No.: PCT/GB86/00018
§ 371 Date: Aug. 20, 1986
§ 102(e) Date: Aug. 20, 1986
[87] PCT Pub. No.: WO86/04200
PCT Pub. Date: Jul. 17, 1986

[30] Foreign Application Priority Data

Jan. 10, 1985 [GB] United Kingdom ................. 8500636

[51] Int. Cl.⁴ .............................................. H04B 9/00
[52] U.S. Cl. ............................................ 370/3; 370/1; 455/607; 455/612; 455/605
[58] Field of Search ............... 455/605, 606, 607, 609, 455/610, 611, 612, 613, 617; 370/3, 1

[56] References Cited

U.S. PATENT DOCUMENTS

| 4,434,510 | 2/1984 | Lemelson | 455/612 |
|---|---|---|---|
| 4,530,084 | 7/1985 | Strebel et al. | 370/3 |
| 4,601,027 | 7/1986 | Scarr et al. | 370/3 |
| 4,635,246 | 1/1987 | Taylor et al. | 370/3 |
| 4,686,667 | 9/1987 | Ohnsorge | 370/4 |

FOREIGN PATENT DOCUMENTS

| 4286385 | 5/1985 | Australia | 455/606 |
|---|---|---|---|
| 0077292 | 4/1983 | European Pat. Off. | 370/3 |
| 0131818 | 1/1985 | European Pat. Off. | 370/3 |
| 2436265 | 2/1976 | Fed. Rep. of Germany | 370/3 |
| 2555458 | 6/1977 | Fed. Rep. of Germany | 370/57 |
| 3220817 | 8/1983 | Fed. Rep. of Germany | 455/617 |

OTHER PUBLICATIONS

Brosio et al., CSELT Rapporti Technici–vol. VIII, #4, Dec. 1980, pp. 259–261, "A Low Consumption Light Powered Telephone on Optical Fiber".
A new copy of the Australian has been ordered.
Cheng et al., "Subscriber Loop Architecture", AT&T Disclosure #75, Sep. 1984, pp. 9–10.

Primary Examiner—Robert L. Griffin
Assistant Examiner—L. Van Beek
Attorney, Agent, or Firm—Nixon & Vanderhye

[57] ABSTRACT

A multi-channel wideband monomode optical fibre network having at least one transmitting station and a plurality of receiving terminals connected to the transmitting station by monomode optical fibres. One or more sources of temporally coherent optical power, for example laser transmitters are connected to the network to feed optical power locally to the receiving terminals. The number of sources is less than the number of terminals.

9 Claims, 3 Drawing Sheets

OPTICAL FIBRE COMMUNICATION NETWORKS WITH LOCAL OPTICAL POWER FEEDING

This is a continuation of application Ser. No. 06/923,826, filed Aug. 20, 1986, now abandoned.

FIELD OF THE INVENTION

The invention relates to optical fibre networks having at least one transmitting station and a plurality of receiving terminals connected to the transmitting station.

BACKGROUND AND SUMMARY OF THE INVENTION

In these networks it is necessary to provide additional optical power for the oscillator associated with each receiving terminal which provides the power for the mixing action in the photodiode of the receiving terminal, and which acts as the primary means of channel selection by frequency tuning in a multi-channel network. Optical power is also required for the modulator. The efficient provision of optical power is therefore a key requirement, particularly for wideband systems to which many terminals are connected. The requirements are particularly demanding in a coherent system where local oscillator power is needed and many more terminals are possible.

The most widely used method of providing optical power is to associate an individual laser with each terminal. Although technically simple, the expense of providing a laser for each terminal and the potential maintenance costs make this solution unattractive. An alternative is to site a single more powerful laser, or a bank of lasers, at a central point in the network and to distribute the optical power along the same optical fibres as the information carrying signals. Such an arrangement shares the laser power and simplifies maintenance but necessitates routing the optical power through many isolators, polarization controllers, combiners and other optical components. Together with the fibre, these introduce considerable optical loss and can absorb a significant part of the optical power.

In accordance with the present invention, an optical fibre network has at least one transmitting station and a plurality of receiving terminals connected to the transmitting station by monomode optical fibres; and one or more sources of temporally coherent optical power connected to the network to feed optical power locally to the receiving terminals, wherein the number of sources is less than the number of terminals.

This invention makes use of the important properties of monomode optical fibres which is that the losses associated with such fibres are much lower than with multimode fibres. This enables optical power to be fed locally to a number of terminals so that the optical losses involved are only those associated with the local optical fibres and not the main network. Furthermore, the number of sources is reduced from one per terminal.

In some cases, each source may comprise a plurality of subsidiary sources for supplying optical power of respectively different wavelengths; and selection means for selecting one of the subsidiary sources to be connected to the network.

This is particularly useful in wideband networks where signals with different wavelengths are passed along the network and enables the correct channel to be received by a receiving terminal.

In general, each source or subsidiary source will comprise a laser transmitter. The selection means may comprise an optical space switch.

In many networks the receiving terminals are arranged in one or more limbs of series connected groups of terminals and in this case each source of optical power may be connected to a respective one or more of the groups.

The networks may take the form of a star or tree distribution structure or a combination of both.

When the receiving terminals are connected in this way, there are a variety of methods by which the sources may be connected to the network. For example, at least one source may be associated with a respective terminal, whereby the source delivers optical power to the associated terminal and to other receiving terminals in the same group downstream of the associated terminal. Conveniently, the associated terminal is positioned at an upstream end of the limb so that all receiving terminals in the same limb are supplied with optical power from the same single source.

Preferably, a multi-port beam splitter (for example with four, six or eight ports) is used to connect terminals to the network. A multi-port beam splitter is hereinafter defined as having a plurality of optical fibres adjacent one another, adjacent ends of the fibres defining two sets of ports and which is arranged such that optical signals received by one port of a set are transmitted in equal or unequal proportions from the other set of ports.

Preferably, all the receiving terminals of a respective limb are connected to the limb by respective four port beam splitters, as hereinbefore defined, first ports of the first and second pairs (sets) of ports facing upstream and downstream of the limb respectively, and a second port of the second pair (set) of ports being connected to the terminals, wherein the receiving terminal associated with a source has a second port of the first pair of ports connected to the source whereby optical power is delivered to the associated receiving terminal via the second port of the second pair and to a downstream receiving terminal via the first port of the second pair.

With this arrangement, each four port beam splitter downstream of the associated terminal receives signals from the transmitting terminal and optical power from the local source at its first port of the first pair and this is passed to the respective terminal via the second port of the second pair while the remaining portion of the signals and optical power are passed to further downstream terminals via the first port of the second pair. The proportions by which the power and signals are split between the output ports depends upon the form of the beam splitter but typically will be 50%.

If six or eight port beam splitters are used, more than one terminal could be connected to the network via different ports of the same splitter.

In another example, at least one source is connected to one or more limbs via additional coupling means spaced from the receiving terminals. For example, one source could be connected to two limbs of series connected groups of receiving terminals upstream of all the terminals in each group. Alternatively, an upstream end of one limb may connected to a mid-portion of another limb.

Clearly, there is a variety of ways in which sources may be connected to limbs and in general this will be decided by the number and physical arrangement of receiving terminals and the number and power of sources available.

Conveniently, the coupling means comprise one or more multi-port beam splitters, as hereinbefore defined.

In a further example, in which each receiving terminal of a limb is connected to the limb by a multi-port beam splitter, as hereinbefore defined, a second port of the first set is also connected to the terminal, and the associated source is arranged to feed optical power along the limb from a downstream end of the limb, whereby optical power is supplied to each terminal in the limb via the second port of the first set.

In this example, optical power travels along the limb in the opposite direction to signals from the transmitting terminal.

It should be understood that in some cases receiving terminals may also have the capability to transmit signals.

BRIEF DESCRIPTION OF THE DRAWINGS

Some examples of multi-channel wideband networks in accordance with the present invention will now be described with reference to the accompanying drawings, in which.

Detailed Description

DETAIL DESCRIPTION

Figure 1A:
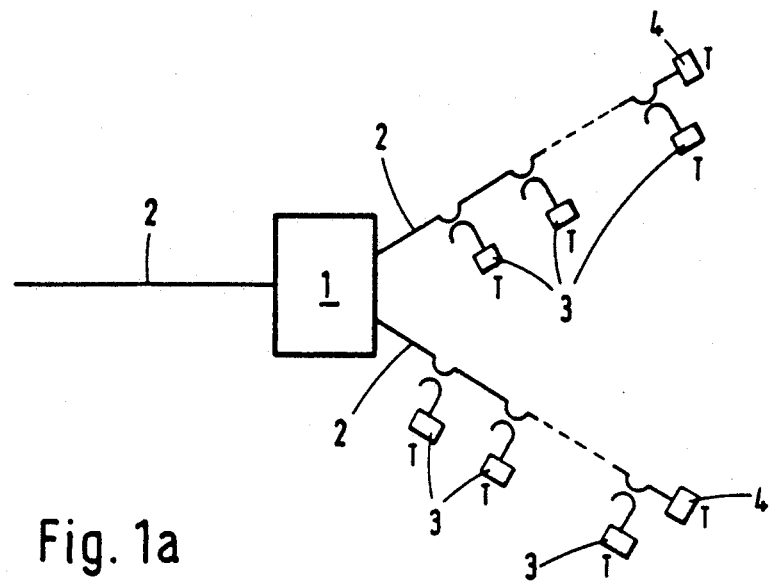
FIGS. 1a and 1b illustrate two different networks.

FIG. 1a illustrates a multi-channel wideband network, such as a local network, having a star form. That is, the network comprises a transmitting terminal 1 connected to three radiating limbs 2 each having a plurality of receiving terminals 3 serially connected to respective limbs. Each limb also has an end terminal 4. The terminals are connected together in each limb 2 by monomode optical fibres. The receiving terminals could comprise telephone, television, interactive videophone or data terminals as required by the customer.

Figure 1B:
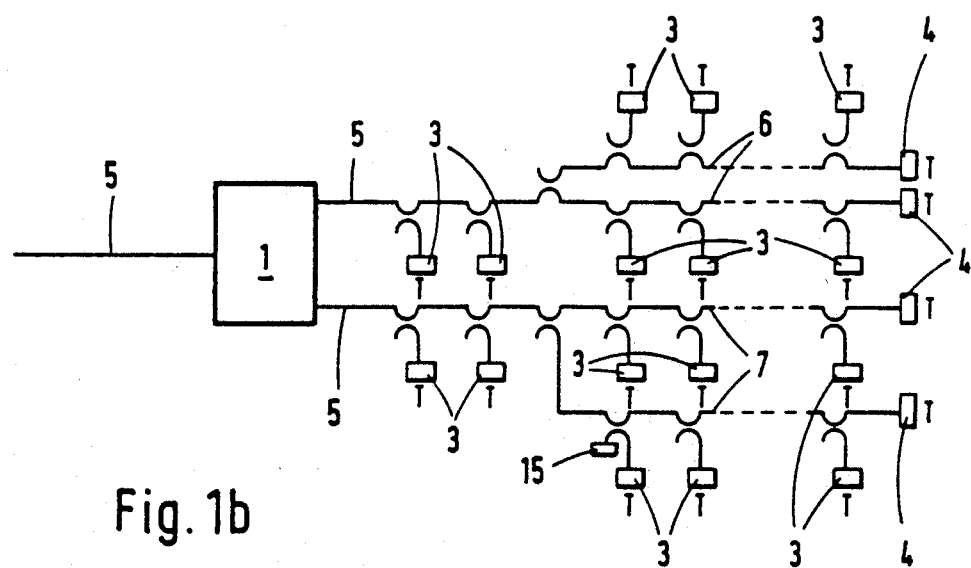

FIG. 1b illustrates a more complex network having a pseudo-tree distribution structure. In this example, the transmitting terminal 1 is connected to three main limbs 5, two of the main limbs subsequently being split into pairs of subsidiary limbs 6, 7.

In each of the networks described, all the terminals 3, that is excluding the end terminals 4, are connected to the network by conventional four port beam splitters. Such a beam splitter is shown in more detail in FIG. 2. At the beam splitter, the optical fibre of the limb is curved as indicated at 8. In practice such a fibre may be formed from a fused pair after reducing its diameter. Each end of this curved portion forms a port 9, 10, constituting a first and a third port, respectively, the port 9 being connected to an upstream receiving terminal or to the transmitting station 1 and the port 10 being connected to a downstream receiving terminal. A second optical fibre 11 has a portion 12 positioned close to the curved portion 8 of the limb optical fibre and defines at each end a respective port 13, 14 constituting a fourth and second port, respectively. The port 13 is connected to receiving terminal 3. Such four port beam splitters are known for use with multimode fibres and in these applications the port 14 is unused. In multi-mode fibres, however, beam splitters can be used to tap signal power only. In the present instance, they are used additionally for the provision of temporally coherent optical power which is essential for a coherent homodyne or heterodyne system. In this description of the ports 9,14 form the first pair and the ports 10,13 a second pair.

Optical signals from the transmitting terminal 1 arrive at the port 9 and due to the proximity between the curved portion 8 and the portion 12 of the adjacent optical fibres the signal power will be split so that a portion (typically 50%) of the signal power is output from the port 10 to the downstream receiving terminal while the remaining portion transfers to the optical fibre 11 and is output from the port 13 to the connected receiving terminal 3.

In order for the receiving terminal 3 to process the incoming signals it is necessary to supply additional optical power, as has previously been described. In this example, additional optical power is supplied by connecting a laser transmitter 15 to the port 14. The laser transmitter 15 transmits a temporally coherent laser beam of a predetermined wavelength into the port 14 which is split in a similar way to the signals arriving at the port 9 so that 50% of the optical power passes to the receiving terminal 3 via the port 13 while the remaining portion transfers to the other optical fibre and is output from the port 10.

Clearly, it is preferable to position the laser transmitter at an upstream end of a limb and an example of a suitable position is shown in FIG. 1b where laser transmitter 15 is connected to the upstream receiving terminal 3 constituting an associated terminal, of the lower limb 7. Additional laser transmitters (now shown) would be required to provide optical power to the other subsidiary limb 7, subsidiary limbs 6, and to the receiving terminals of the limbs 5.

Figure 2:
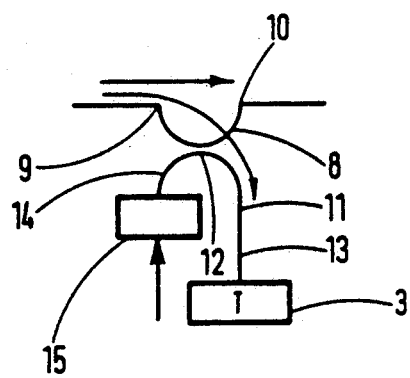
FIG. 2 illustrates diagrammatically one example of a receiving terminal and associated source of optical power.
Figure 3:
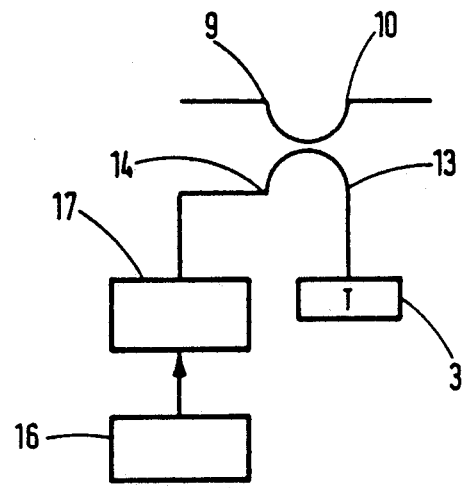
FIG. 3 illustrates a second example of a receiving terminal and associated source of optical power.

FIG. 3 illustrates a modified form of the arrangement shown in FIG. 2. In multi-channel networks information in different channels is associated with different wavelength signals. In order for the receiving terminals 3 to receive the correct channel, they must be supplied with optical power of the correct wavelength. In this example, a bank of lasers 16 is connected to the port 14 of the beam splitter via an optical space switch 17. Each laser of the bank of lasers 16 supplies optical power with a different wave length corresponding to one of the channels transmitted around the network. The optical space switch 17 can be controlled (by means not shown but of a known form) to select one of the beams of optical power corresponding to the channel which it is desired that the receiving terminals of the particular limb should receive.

Figure 4:
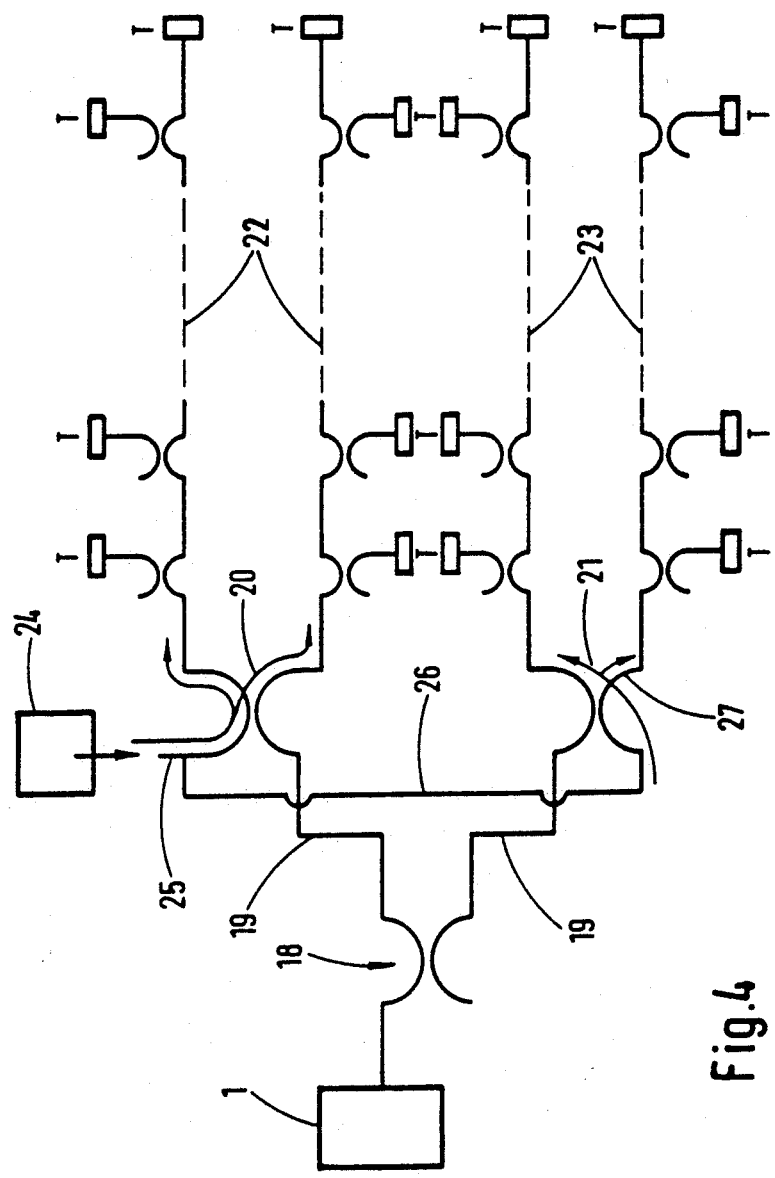
FIG. 4 illustrates a third example for feeding optical power into a network; and, FIG. 5 illustrates a fourth example for feeding optical power into a network.

An alternative way to feed additional optical power into a network is illustrated in FIG. 4. In this network signals from the transmitting terminal 1 are split by a four port beam splitter 18 so that they pass into two limbs 19. Each limb 19 is further split by respective four port beam splitters 20, 21 so that signals are fed to pairs of subsidiary limbs 22, 23. A laser transmitter 24 feeds optical power into the previously unused port 25 of the beam splitter 20. This optical power is split in a conventional manner by the beam splitter 20 to pass down each subsidiary limb 22. In addition, a cross-link monomode optical fibre 26 is provided to connect the port 25 with the normally unused port 27 of the beam splitter 21. Thus optical power is also supplied to the beam splitter 21 where it is split in a similar manner and fed to the subsidiary limbs 23.

Figure 5:
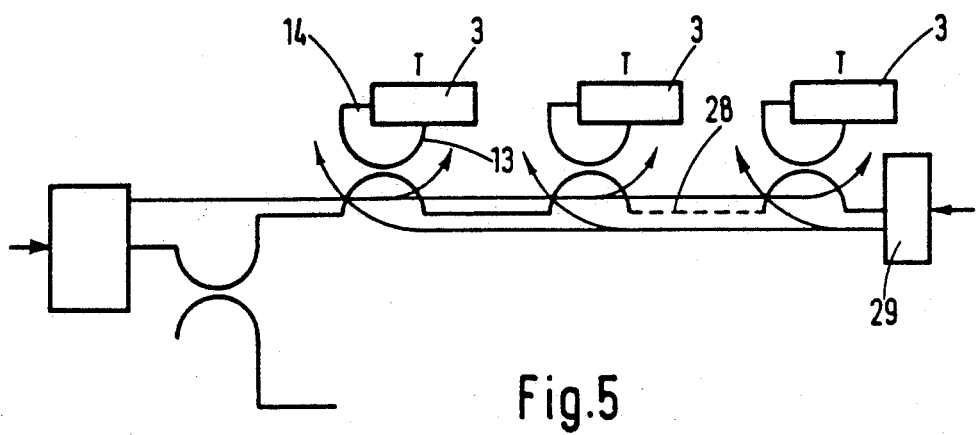

FIG. 5 illustrates a portion of another network in which for simplicity only a single limb 28 has been illustrated. In this example, each of the receiving terminals 3 has its normally unused port 14 connected to it. A laser transmitter 29 is positioned at the downstream end of the limb 28 to feed optical power up the limb 28 in a direction opposite to the direction of signals from the transmitting terminal 1. Each beam splitter associated with the terminals 3 causes signals from the transmitting terminal 1 to be split, as before, so that they pass to the terminal 3 and continue along the limb 28, but also causes optical power from the laser transmitter 29 to be split so that a portion passes to each terminal 3 from via respective ports 14.

I claim:

1. An optical fibre network comprising:
   a transmitting station;
   a plurality of receiving terminals connected to the transmitting station by monomode optical fibres; and
   at least one local network which includes a group of said receiving terminals and is smaller than said optical fibre network and has a local source of optical power connected thereto for feeding optical power locally only to said group of receiving terminals, said local source being remote from said transmitting station.

2. A network according to claim 1, wherein said local source comprises a plurality of subsidiary sources for supplying optical power of respectively different wavelengths; and selection means for selecting one of the subsidiary sources to be connected to the network.

3. A network according to claim 1 or claim 2, wherein the receiving terminals are arranged in one or more limbs of series connected groups of terminals, said local source of optical power being connected to a respective one or more of the groups.

4. A network according to claim 3, wherein at least one local source is associated with a respective associated terminal and arranged to deliver optical power to that associated terminal and to other receiving terminals in the same group downstream of the associated terminal.

5. An optical fibre network having:
   at least one transmitting station and a plurality of receiving terminals connected to the transmitting station by monomode optical fibres; and
   one or more local sources of temporally coherent optical power connected to the network to feed optical power locally to the receiving terminals, wherein the number of said local sources is less than the number of terminals;
   wherein the receiving terminals are arranged in one or more limbs of series connected groups of terminals, each local source of optical power being connected to a respective one or more of the groups; and
   wherein at least one local source is connected to two or more limbs.

6. A network according to claim 5, wherein a coupling means including one or more four port beam splitters connects said local source to said two or more limbs.

7. An optical fibre network having:
   at least one transmitting station and a plurality of receiving terminals connected to the transmitting station by monomode optical fibres; and
   one or more local sources of temporally coherent optical power connected to the network to feed optical power locally to the receiving terminals, wherein the number of said local sources is less than the number of terminals;
   wherein the receiving terminals are arranged in one or more limbs of series connected groups of terminals, each local source of optical power being connected to a respective one or more of the groups; and
   wherein at least one local source is associated with a respective associated terminal and arranged to deliver optical power to that associated terminal and to other receiving terminals in the same group downstream of the associated terminal; and
   wherein each receiving terminal of a respective limb is connected to that limb by a respective four port beam splitter, each beam splitter having a first and a second port, constituting a first pair of ports, and a third and a fourth port, constituting a second pair of ports, said first and second pair of ports facing upstream and downstream of the limb, respectively, and in which;
   (a) each terminal is connected to the fourth port of its respective beam splitter;
   (b) the second port of the beam splitter of the associated terminal is connected to the respective local source;
   (c) the third port of the beam splitter of the associated terminal is connected to the first port of the beam splitter next downstream of the associated terminal; and
   (d) the first port of each terminal which is not an associated terminal is connected to the third port of the beam splitter next upstream; whereby a portion of the optical power delivered to the beam splitter of the associated terminal is delivered to the associated terminal via its fourth port and downstream to the remaining terminals of the respective group of series connected terminals via its third port.

8. An optical fibre network having:
   at least one transmitting station and a plurality of receiving terminals connected to the transmitting station by monomode optical fibres; and
   one or more local sources of temporally coherent optical power connected to the network to feed optical power locally to the receiving terminals, wherein the number of said local sources is less than the number of terminals;
   wherein the receiving terminals are arranged in one or more limbs of series connected groups of terminals, each local source of optical power being connected to a respective one or more of the groups; and
   wherein at least one local source is associated with a respective associated terminal and is arranged to feed optical power along a limb from a downstream end of that limb and in which each receiving terminal is connected to that limb by a multiport beam splitter so as to receive optical power transmitted downstream from the associated terminal.

9. An optical fibre network having:

at least one transmitting station and a plurality of receiving terminals connected to the transmitting station by monomode optical fibres; and one or more local sources of temporally coherent optical power connected to the network to feed optical power locally to the receiving terminals, wherein the number of said local sources is less than the number of terminals; and wherein said at least one transmitting station is arranged to transmit wideband transmissions.

* * * * *